US012282515B2

(12) United States Patent
Choi et al.

(10) Patent No.: US 12,282,515 B2
(45) Date of Patent: Apr. 22, 2025

(54) METHOD AND DEVICE FOR COLLECTING WEBSITE

(71) Applicant: S2W INC., Seongnam-si (KR)

(72) Inventors: Jae Min Choi, Seongnam-si (KR);
Chang Hoon Yoon, Seongnam-si (KR);
Yeon Keun Kim, Yongin-si (KR)

(73) Assignee: S2W INC., Seongnam-si (KR)

( * ) Notice: Subject to any disclaimer, the term of this patent is extended or adjusted under 35 U.S.C. 154(b) by 0 days.

(21) Appl. No.: 17/873,378

(22) Filed: Jul. 26, 2022

(65) Prior Publication Data
US 2023/0032625 A1    Feb. 2, 2023

(30) Foreign Application Priority Data

Jul. 27, 2021  (KR) .................. 10-2021-0098229

(51) Int. Cl.
| | | |
|---|---|---|
| *G06F 16/951* | (2019.01) | |
| *G06F 16/955* | (2019.01) | |
| *G06F 21/31* | (2013.01) | |
| *G06F 21/36* | (2013.01) | |
| *G06N 20/00* | (2019.01) | |

(52) U.S. Cl.
CPC .......... *G06F 16/951* (2019.01); *G06F 16/955* (2019.01); *G06F 21/31* (2013.01); *G06F 21/36* (2013.01); *G06N 20/00* (2019.01); *G06F 2221/2133* (2013.01)

(58) Field of Classification Search
CPC ...... G06F 16/951; G06F 16/955; G06F 21/36; G06F 2221/2133
USPC ....................................................... 707/709
See application file for complete search history.

(56) References Cited

U.S. PATENT DOCUMENTS

| | | | | |
|---|---|---|---|---|
| 9,003,474 B1* | 4/2015 | Smith | .................... | G06F 17/00 |
| | | | | 715/205 |
| 9,424,414 B1* | 8/2016 | Demirjian | ............... | G06F 21/36 |
| 9,767,263 B1* | 9/2017 | McInerny | ............... | G06F 21/31 |
| 10,050,787 B1* | 8/2018 | Johansson | ............. | H04L 9/0866 |
| 10,489,576 B2* | 11/2019 | Li | ............................ | H04L 63/08 |

(Continued)

FOREIGN PATENT DOCUMENTS

KR          10-2257139 B1     5/2021

OTHER PUBLICATIONS

Korean Office Action dated Jan. 29, 2024 in Application No. 10-2021-0098229.

*Primary Examiner* — Sherief Badawi
*Assistant Examiner* — Jessica N Le
(74) *Attorney, Agent, or Firm* — Sughrue Mion, PLLC

(57) ABSTRACT

According to a one embodiment of the present invention, a method for collecting a website in an electronic device includes: step a of accessing a web server corresponding to a Uniform Resource Locator (URL) and receiving a website corresponding to the URL; step b of obtaining a first solution key based on a CAPTCHA solution model when CAPTCHA exists in the website; step c of transmitting the first solution key to the web server and receiving an authentication result; step d of recalculating the first solution key when authentication of the first solution key has failed and transmitting a CAPTCHA resolution request signal to a user terminal when the authentication has failed more than a preset number of times; and step e of receiving a second solution key from the user terminal, transmitting the second solution key to the web server, and crawling the website.

6 Claims, 2 Drawing Sheets

(56) References Cited

U.S. PATENT DOCUMENTS

| | | | |
|---|---|---|---|
| 10,915,610 B2* | 2/2021 | Jadhav | G06N 20/00 |
| 2011/0131652 A1* | 6/2011 | Robinson | H04L 63/1408 |
| | | | 726/22 |
| 2012/0254940 A1* | 10/2012 | Raper | H04L 63/083 |
| | | | 726/3 |
| 2012/0254971 A1* | 10/2012 | Hu | G06F 21/36 |
| | | | 726/9 |
| 2013/0036342 A1* | 2/2013 | Deo | G06Q 30/02 |
| | | | 715/202 |
| 2014/0250538 A1* | 9/2014 | Rapaport | G06F 21/31 |
| | | | 726/28 |
| 2017/0366564 A1* | 12/2017 | Ping | H04L 63/20 |
| 2018/0063107 A1* | 3/2018 | Gonen | G06F 21/31 |
| 2018/0114001 A1* | 4/2018 | Jain | H04L 63/083 |
| 2019/0394333 A1* | 12/2019 | Jiron | G06F 21/32 |
| 2020/0065467 A1* | 2/2020 | Komnata | G06F 21/36 |
| 2020/0159790 A1* | 5/2020 | Barbosa | G06F 16/9558 |
| 2023/0018027 A1* | 1/2023 | Bhide | G06F 21/31 |

* cited by examiner

METHOD AND DEVICE FOR COLLECTING WEBSITE

BACKGROUND OF THE INVENTION

Field of the Invention

The present invention relates to a method and device for collecting a website, and more particularly, to a method and device for automatically and/or manually collecting a website through crawling.

Description of the Related Art

With the rapid development of IT technology, users can obtain desired information regardless of location and time. Accordingly, a technology for collecting data from various websites has been being developed in portal sites and the like to provide user-desired information.

Web crawling refers to collecting data from a website to provide information to users. In the case of a method of automatically collecting a website using web crawling, there is a problem in that it is difficult to access websites. Hence, there is a need for technology for accessing websites.

SUMMARY OF THE INVENTION

The present invention has been made to solve the above-mentioned problems, and an object of the present invention is to collect a website in a manner of combining an automatic method and a manual method.

In addition, an object of the present invention is to solve the CAPTCHA (Completely Automated Public Turing test to tell Computers and Humans Apart) by creating a solution key through a CAPTCHA solution model for a website containing the CAPTCHA and requesting a user to solve the CAPTCHA when authentication of the solution key has failed, in collecting the website.

According to an aspect of the present invention, a method for collecting a website by an electronic device includes: step a of accessing a web server corresponding to a Uniform Resource Locator (URL) and receiving a website corresponding to the URL, step b of obtaining a first solution key based on a CAPTCHA solution model when CAPTCHA exists in the website, step c of transmitting the first solution key to the web server and receiving an authentication result, step d of recalculating the first solution key when authentication of the first solution key has failed and transmitting a CAPTCHA resolution request signal to a user terminal when the authentication has failed more than a preset number of times, and step e of receiving a second solution key from the user terminal, transmitting the second solution key to the web server, and crawling the website.

According to an aspect of the present invention, a device for collecting website includes: a collection module configured to access a web server corresponding to a Uniform Resource Locator (URL), receive a website corresponding to the URL, obtain a first solution key based on a CAPTCHA solution model when CAPTCHA exists in the website, transmit the first solution key to the web server, receive an authentication result, recalculate the first solution key when authentication of the first solution key has failed, transmit a CAPTCHA resolution request signal to a user terminal when the authentication has failed more than a preset number of times, receive a second solution key from the user terminal, transmit the second solution key to the web server, and crawl the website; and a control module configured to control operation of the collection module.

DETAILED DESCRIPTION OF THE PREFERRED EMBODIMENTS

Figure 1:
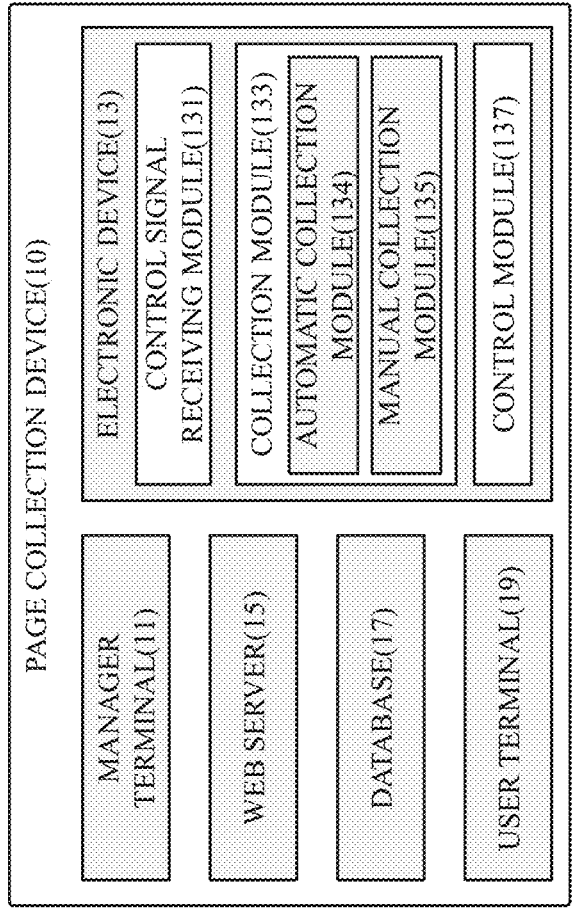
FIG. 1 is a block diagram for describing a device for collecting a website according to an embodiment of the present invention.

The above-described objects, features, and advantages will be described in detail below with reference to the accompanying drawings, and accordingly, a person skilled in the art to which the present invention pertains can easily implement the technical spirit of the present invention. In describing the present invention, when it is determined that the detailed description of the known technology related to the present invention may unnecessarily obscure the gist of the present invention, the detailed description thereof will be omitted.

In the drawings, the same reference numerals are used to indicate the same or similar elements, and all combinations described in the specification and claims may be combined in any manner. It should be noted that reference to the singular includes the plural unless the context clearly dictates otherwise, and reference to the singular form is also understood to imply the inclusion of plural forms.

The terminology used herein is for the purpose of describing specific exemplary embodiments only and is not intended to limit the present invention. As used herein, the singular forms "a", "an" and "the" are intended to include the plural forms as well, unless the context clearly indicates otherwise. The term "and/or" includes all combinations and any one of items listed in connection therewith. The terms "comprise", "comprising", "including", "having", and the like have inclusive meanings, and accordingly, these terms specify features, integers, steps, operations, elements, and/or components, and does not exclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

In addition, each component may be implemented as a hardware processor, the above components may be integrated to be implemented as a single hardware processor, or the above components may be combined with each other to be implemented as a plurality of hardware processors.

Hereinafter, preferred embodiments of the present invention will be described in detail with reference to the accompanying drawings.

Conventional website collection methods include an automatic method based on web crawling and a manual method in which a user directly collects all content included in a website. The automatic method has difficulties such as difficulties in accessing websites when a login and/or the CAPTCHA exists or possibility of access blocked by websites with policies that block accounts, and the manual method has difficulties such as requirement for a lot of manpower and an increase in the cost of hiring when there are a number of websites, and also has problems such as duplicate collection, images and/or files that were not loaded at the time of collection, and a decrease in collection speed due to website loading time since a user directly collects websites.

Accordingly, according to an embodiment of the present invention, a website collection device 10 may set automatic collection as a default value when collecting websites, and receives the CAPTCHA solution key, which is difficult for a computer program to solve, from a user to facilitate a website collection process.

FIG. 1 is a block diagram for describing a website collection device according to an embodiment of the present invention. Referring to FIG. 1, the website collection device 10 according to an embodiment of the present invention may include a manager terminal 11 that controls a website collection process, a web server 15 that provides a website connected through a separate communication network, an electronic device 13 that accesses the web server 15 to collect websites, a database 17 that stores the collected websites, and a user terminal 19 that manually collects a website.

The electronic device 13 and the web server 15 may be implemented using a server, but the present invention is not necessarily limited thereto. The electronic device 13 and the web server 15 may be implemented in various forms, such being implemented as a separate electronic device or as an application running on a wired or wireless terminal including a mobile terminal, such as a smartphone, a tablet PC, a PDA, or a mobile phone, or a personal computer.

Specifically, the electronic device 13 may include a control signal receiving module 131, a collection module 133, and a control module 137. Furthermore, the collection module 133 may further include an automatic collection module 134 and a manual collection module 135.

The control signal receiving module 131 may receive a website collection request from the manager terminal 11. The collection request may include a URL of a website to be collected and a collection method, and the collection method may be any one selected by the manager terminal 11 among an automatic collection method or a manual collection method.

The collection module 133 may perform control such that the automatic collection module 134 operates when the automatic collection method is selected by the manager terminal 11, and perform control such that the manual collection module 135 operates when the manual collection method is selected.

The automatic collection module 134 may access the web server 15 based on the URL included in the website collection request. The automatic collection module 134 may receive a website corresponding to a corresponding URL from the web server 15 corresponding to the URL, and crawl the received website.

When a website contains a login and/or the CAPTCHA, and the login and/or the input of the CAPTCHA are required to access the website, the automatic collection module 134 may solve the login and/or the CAPTCHA based on account information stored in the database 17 and a CAPTCHA solution model. CAPTCHA (Completely Automated Public Turing test to tell Computers and Humans Apart) is a type of Human Interaction Proof (HIP) technology, which is used to distinguish whether a certain user is a real person or a computer program.

When performing the login, the automatic collection module 134 may access the website by logging in to the website based on the account information stored in the database 17.

Meanwhile, when the account information of the corresponding website does not exist in the database 17, the automatic collection module 134 may create an account and store the crated account information in the database 17.

Furthermore, when CAPTCHA authentication is required to access the website, the automatic collection module 134 may solve the CAPTCHA based on the CAPTCHA solution model.

The CAPTCHA solution model according to an embodiment of the present invention may employ Speech To Text (STT), OCR, AI-based text identification algorithm, or the like.

The STT is a model that interprets voice language and converts it into text data. The automatic collection module 134 may obtain a first solution key by converting voice data reproduced by selecting a voice play button or a sound output button included in the CAPTCHA screen into text data.

The OCR is an optical character recognition technology, and the automatic collection module 134 may obtain a first solution key by converting a CAPTCHA image included in a CAPTCHA screen into a computer-readable machine language.

The AI-based text identification algorithm is an algorithm that obtains the solution key of the CAPTCHA by analyzing the CAPTCHA image, and a machine learning model trained using the solution key corresponding to the CAPTCHA image as training data may be used. The automatic collection module 134 may obtain the first solution key by using the CAPTCHA image included in the CAPTCHA screen as input data of the machine learning model. In this case, the machine learning model and the data processing process of the machine learning model are based on conventional techniques.

The automatic collection module 134 may transmit the first solution key to the web server 15 by inputting the first solution key into an input box of a CAPTCHA solution included in the CAPTCHA screen. The automatic collection module 134 may receive an authentication result for the first solution key from the web server 15, and access and crawl the website when the first solution key is authenticated.

The manual collection module 135 may transmit a website collection request signal to the user terminal 19 when a manual collection method is selected by the manager terminal 11. The website collection request signal may include a URL address received from the manager terminal 11.

The manual collection module 135 may receive collected content from the user terminal 19 when the user terminal 19 has completed the collection of all content (e.g., HTML, JavaScript, Cascading Style Sheets (CSS), images, videos, etc.) of a corresponding website using the received URL address.

The control module 137 may control the collection module 133 and further prevent blocking of an account used in automatically accessing a website through the automatic collection module 134.

When the control module 137 transmits the first solution key to the web server 15 through the automatic collection module 134 but receives an authentication failure signal from the web server 15, the control module 137 may perform control such that the automatic collection module 134 recalculates the first solution key based on the CAPTCHA solution model.

When the control module 137 receives the authentication failure signal from the web server 15 more than a preset number of times, the control module 137 may transmit an automatic collection failure message to the manager terminal 11 and, at the same time, request the manager terminal 11 to select one of the manual website collection process and manual resolution of CAPTCHA.

When the manual website collection process is selected by the manager terminal 11, the control module 137 may transmit a website collection request signal to the manual collection module 135.

On the other hand, the control module 137 may transmit the CAPTCHA image of the corresponding website to the user terminal 19 and receive a second solution key from the user terminal 19 when the manual resolution of CAPTCHA is selected by the manager terminal 11. Through this, the website collection device 10 of the present invention may allow a user to solve the CAPTCHA for a website which the automatic collection module 134 is unable to directly access, there by resolving omission of information in collecting the website.

When the control module 137 receives the second solution key, the control module 137 may transmit the second solution key to the automatic collection module 134 to enable the second solution key to be authenticated, and allow the automatic collection module 134 to continuously crawl the website. When the authentication of the second solution key has failed, the control module 137 may re-request the second solution key from the user terminal 19 to enable the second solution key to be authenticated.

The control module 137 according to an embodiment of the present invention may add, to the training data set of the CAPTCHA solution model, the CAPTCHA image, the second solution key of which authentication has succeeded and/or failed, and the first solution key of which authentication has succeeded and/or failed to enhance the CAPTCHA solution model.

The control module 137 will store content contained in the website collected through the automatic collection module 134 and the manual collection module 135 in the database 17.

Furthermore, the control module 137 may access the website regularly or irregularly using the account information stored in the database 17 to update an access record. Through this, the control module 137 can prevent an account being blocked by the website itself due to not accessing for a long period of time.

Figure 2:
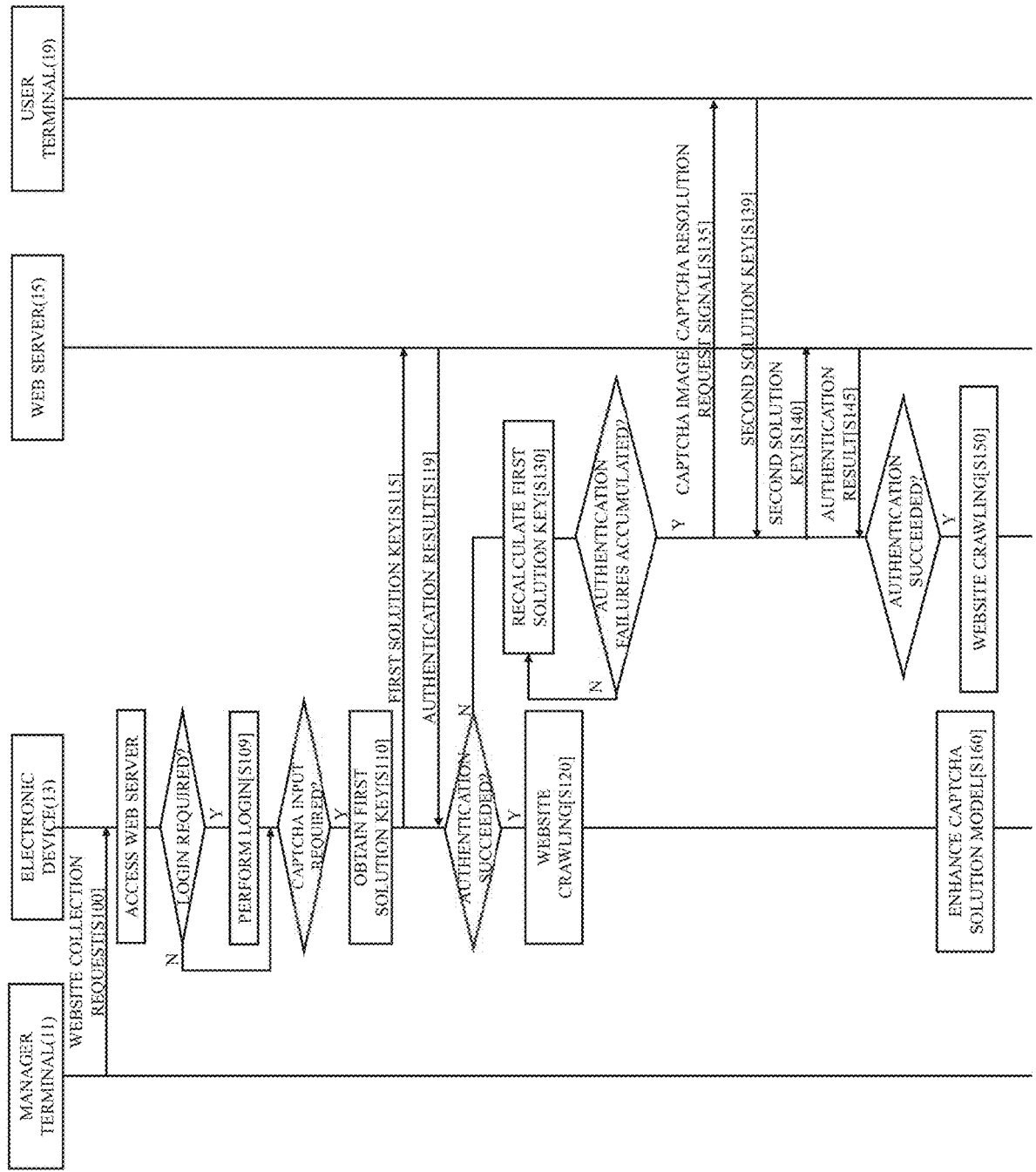
FIG. 2 is a flowchart for describing a method for collecting a website according to an embodiment of the present invention.

FIG. 2 is a flowchart for describing a method for collecting a website according to an embodiment of the present invention. Hereinafter, a method for collecting a website will be described with reference to FIG. 2. In the description of the method for collecting a website, the detailed embodiment overlapping with the aforementioned website collection device may be omitted.

In step 100, the electronic device 13 may receive a website collection request from the manager terminal 11. The collection request according to an embodiment of the present invention will include the URL of a website to be collected and a collection method (a manual collection method or an automatic collection method).

In step 105, when the automatic collection method is selected by the manager terminal 11, the electronic device 13 may access the web server 15 based on the URL included in the website collection request.

When the electronic device 13 accesses the web server 15, the electronic device 13 may receive a website corresponding to the URL from the web server 15. In this case, when the website contains a login and the login is required to access the website, the electronic device 13 may perform the login based on account information stored in the database 17 to access the website (S109). In this case, when the account information of the corresponding website does not exist in the database 17, the electronic device 13 may create an account and store the created account information in the database 17.

In step 110, when the input of the CAPTCHA is further required in accessing the website through the web server 15, the electronic device 13 may obtain a first solution key based on the CAPTCHA solution model.

The CAPTCHA solution model according to an embodiment of the present invention may adopt conventional techniques such as speech to text (STT), OCR, and AI-based text recognition models.

The STT is a model that interprets voice language and converts it into text data. The electronic device 13 may obtain a first solution key by converting voice data reproduced by selecting a voice play button or a sound output button included in the CAPTCHA screen into text data.

The OCR is an optical character recognition technology, and the electronic device 13 may obtain a first solution key by converting a CAPTCHA image included in a CAPTCHA screen into a computer-readable machine language.

The AI-based text identification algorithm is an algorithm that obtains the solution key of the CAPTCHA by analyzing the CAPTCHA image, and a machine learning model trained using the solution key corresponding to the CAPTCHA image as training data may be used. The electronic device 13 may obtain the first solution key by using the CAPTCHA image included in the CAPTCHA screen as input data of the machine learning model. In this case, the machine learning model and the data processing process of the machine learning model are based on conventional techniques.

In step 115, the electronic device 13 may transmit the first solution key to the web server 15. The electronic device 13 may transmit the first solution key to the web server 15 by inputting the first solution key into an input box of a CAPTCHA solution included in the CAPTCHA screen.

In step 119, the electronic device 13 may receive an authentication result for the first solution key from the web server 15. When the first solution key is authenticated by the web server 15, the electronic device 13 may access and crawl the website (S120).

Meanwhile, in step 130, when receiving an authentication failure signal from the web server 15, the electronic device 13 may recalculate the first solution key based on the CAPTCHA solution model.

When the electronic device 13 receives the authentication failure signal from the web server 15 more than a preset number of times, the electronic device 13 may transmit an automatic collection failure message to the manager terminal 11 and further transmit a CAPTCHA resolution method selection request signal to the manager terminal 11. The CAPTCHA resolution method selection request signal may include manual website collection process and manual resolution of CAPTCHA.

In step 135, when receiving a signal for selecting the manual resolution of CAPTCHA from the manager terminal 11, the electronic device 13 may transmit a CAPTCHA image included in the website and a CAPTCHA resolution request signal to the user terminal 19, and receive a second solution key from the user terminal 19 (S139).

Meanwhile, the electronic device 13 may transmit a website collection request signal to the user terminal 19 when receiving, from the user terminal 19, the signal for selecting the manual website collection process.

When receiving the second solution key from the user terminal 19, the electronic device 13 may transmit the second solution key to the web server 15 (S140) and, when the second solution key is authenticated by the web server 15 (S145), solve the website's CAPTCHA and access the website.

In step 150, the electronic device 13 may collect the website by accessing and crawling the website.

The electronic device 13 according to an embodiment of the present invention may add, to the training data set of the CAPTCHA solution model, the CAPTCHA image, and the first and second solution keys of which authentication has succeeded and/or failed to further enhance the CAPTCHA solution model.

Although not separately shown in FIG. 2, the electronic device according to an embodiment of the present invention may transmit, to the user terminal 19, the website collection request signal when the collection method included in the website collection request received from the manager terminal 11 is a manual collection method in step 105. The website collection request signal may include a URL address received from the manager terminal 11.

Thereafter, the electronic device 13 may receive collected content from the user terminal 19 when the user terminal 19 has completed the collection of all content included in the corresponding website using the received URL address.

The embodiments of the present invention disclosed in the present specification and drawings are provided only to provide specific examples to easily describe the technical contents of the present invention and to aid understanding of the present invention, and are not intended to limit the scope of the present invention. It is obvious to those of ordinary skill in the art that other modifications based on the technical idea of the invention can be implemented in addition to the embodiments disclosed therein.

According to the present invention as described above, it is possible to collect a website in a manner of combining an automatic method and a manual method.

In addition, according to the present invention, it is possible to solve the CAPTCHA (Completely Automated Public Turing test to tell Computers and Humans Apart) by creating a solution key through a CAPTCHA solution model for a website containing the CAPTCHA and requesting a user to solve the CAPTCHA when authentication of the solution key has failed, in collecting the website.

While the present invention has been described with respect to the specific embodiments, it will be apparent to those skilled in the art that various changes and modifications may be made without departing from the spirit and scope of the invention as defined in the following claims.

What is claimed is:

1. A method for collecting a website in an electronic device, the method comprising:
    receiving, by the electronic device, from a manager terminal, a website collection request including a Uniform Resource Locator (URL) and a collection method which is one selected by the manager terminal among an automatic collection method or a manual collection method;
    accessing, by the electronic device, a web server corresponding to the URL and receiving, by the electronic device, a website corresponding to the URL based on the automatic collection method being selected by the manager terminal, the electronic device being different from each of the manager terminal and the web server;
    obtaining, by the electronic device, a first solution key based on a Completely Automated Public Turing test to tell Computers and Humans Apart (CAPTCHA) solution model without a user input for responding to the CAPTCHA when the CAPTCHA exists in the website;
    transmitting, by the electronic device, the first solution key to the web server and receiving, by the electronic device, an authentication result from the web server; and
    recalculating, by the electronic device, the first solution key based on the CAPTCHA solution model without the user input for responding to the CAPTCHA when authentication of the first solution key has failed,
    wherein the method comprises, based on a number of failures of the authentication being equal to or less than a preset number, repeating, by the electronic device, the recalculating of the first solution key based on the CAPTCHA solution model without the user input for responding to the CAPTCHA, and
    wherein the method comprises:
        based on a number of failures of the authentication being more than the preset number, transmitting, by the electronic device, to the manager terminal, an automatic collection failure message and a CAPTCHA resolution method selection request signal for requesting the manager terminal to select either (i) a manual website collection process or (i) a manual resolution of CAPTCHA,
        receiving an input from the manager terminal for selecting (i) the manual website collection process among (i) the manual website collection process and (ii) the manual resolution of CAPTCHA,
        based on receiving the input for selecting (i) the manual website collection process among (i) the manual website collection process and (ii) the manual resolution of CAPTCHA from the manager terminal, transmitting, by the electronic device, a website collection request signal including the URL to a user terminal and receiving, by the electronic device, from the user terminal, a content corresponding to the website and collected by the user terminal using the URL,
        based on receiving the input for selecting (ii) the manual resolution of the CAPTCHA among (i) the manual website collection process and (ii) the manual resolution of CAPTCHA from the manager terminal, transmitting, by the electronic device, a CAPTCHA image included in the website and a CAPTCHA resolution request signal to the user terminal, and
        receiving, by the electronic device, a second solution key from the user terminal, transmitting, by the electronic device, the second solution key to the web server, and crawling, by the electronic device, the website.

2. The method of claim 1, further comprising:
    further performing login based on account information stored in a database when the login is required to access the website.

3. The method of claim 1, wherein the CAPTCHA solution model is based on at least one of Speech To Text (STT), Optical Character Recognition (OCR), and an Artificial Intelligence (AI)-based text recognition model.

4. The method of claim 1, wherein the crawling of the website further includes crawling the website when authentication of the first solution key has succeeded.

5. The method of claim 1, further comprising:
adding the CAPTCHA image, the first solution key and the second solution key of which authentication has succeeded and/or failed to a training data set of the CAPTCHA solution model to enhance the CAPTCHA solution model.

6. An electronic device for collecting website, the electronic device comprising:
a processor; and
a memory storing instructions executable by the processor,
wherein the processor is configured to:
receive, from a manager terminal, a website collection request including a Uniform Resource Locator (URL) and a collection method which is one selected by the manager terminal among an automatic collection method or a manual collection method,
access a web server corresponding to the URL, and receive a website corresponding to the URL based on the automatic collection method being selected by the manager terminal, the electronic device being different from each of the manager terminal and the web server,
obtain a first solution key based on a Completely Automated Public Turing test to tell Computers and Humans Apart (CAPTCHA) solution model without a user input for responding to the CAPTCHA when the CAPTCHA exists in the website,
transmit the first solution key to the web server, and receive an authentication result from the web server,
recalculate the first solution key based on the CAPTCHA solution model without the user input for responding to the CAPTCHA when authentication of the first solution key has failed,
wherein the processor is further configured to, based on a number of failures of the authentication being equal to or less than a preset number, repeat the recalculating of the first solution key based on the CAPTCHA solution model without the user input for responding to the CAPTCHA, and
wherein the processor is further configured to:
based on a number of failures of the authentication being more than the preset number, transmit, to the manager terminal, an automatic collection failure message and a CAPTCHA resolution method selection request signal for requesting the manager terminal to select either (i) a manual website collection process or (i) a manual resolution of CAPTCHA,
receiving an input from the manager terminal for selecting (i) the manual website collection process among (i) the manual website collection process and (ii) the manual resolution of CAPTCHA,
based on receiving the input for selecting (i) the manual website collection process among (i) the manual website collection process and (ii) the manual resolution of CAPTCHA from the manager terminal, transmit a website collection request signal including the URL to a user terminal and receive, from the user terminal, a content corresponding to the website and collected by the user terminal using the URL,
based on receiving the input for selecting (ii) the manual resolution of the CAPTCHA among (i) the manual website collection process and (ii) the manual resolution of CAPTCHA from the manager terminal, transmit a CAPTCHA image included in the website and a CAPTCHA resolution request signal to the user terminal, and
receive a second solution key from the user terminal, transmit the second solution key to the web server, and crawl the website.

* * * * *